United States Patent [19]

Beck

[11] Patent Number: 4,567,420

[45] Date of Patent: Jan. 28, 1986

[54] SEMI-CONDUCTOR MOTOR CONTROL SYSTEM

[75] Inventor: William H. Beck, Rancho Palos Verdes, Calif.

[73] Assignee: Ross Hill Controls Corporation, Houston, Tex.

[21] Appl. No.: 597,902

[22] Filed: Apr. 9, 1984

Related U.S. Application Data

[63] Continuation-in-part of Ser. No. 496,688, May 20, 1983, abandoned.

[51] Int. Cl.$^4$ ............................................. H02P 5/40
[52] U.S. Cl. ..................................... 318/803; 363/138
[58] Field of Search ................ 318/801, 803, 807–811; 363/138, 40, 37, 135, 27; 307/252 M

[56] References Cited

U.S. PATENT DOCUMENTS

| | | | |
|---|---|---|---|
| 3,538,419 | 11/1970 | Seki et al. | 363/138 |
| 3,665,286 | 5/1972 | Ohno et al. | 363/27 |
| 3,753,064 | 8/1973 | Agarwal et al. | 318/803 |
| 3,863,121 | 1/1975 | Rettig | 318/801 |
| 3,872,364 | 3/1975 | Hubner | 363/37 |
| 3,887,862 | 6/1975 | Hubner | 318/803 |
| 4,039,926 | 8/1977 | Stegerwald | 363/138 |
| 4,145,647 | 3/1979 | Nielsen et al. | 318/810 |
| 4,215,304 | 7/1980 | D'Atre et al. | 318/808 |
| 4,330,741 | 5/1928 | Nagase et al. | 318/803 |
| 4,409,647 | 10/1983 | Tekanian | 363/37 |

Primary Examiner—David Smith, Jr.
Attorney, Agent, or Firm—Fulbright & Jaworski

[57] ABSTRACT

A semi-conductor system for controlling three phase motors by voltage and/or frequency variations. An input circuit provides dc power, such as a three phase full wave input bridge with silicon control rectifiers to provide a voltage controlled dc power output. An output inverter bridge having six silicon rectifiers receives dc power and converts it to three phase ac power for operating an induction motor. A diverter network is connected between the dc power input circuit and the output inverter and is activated periodically for temporarily diverting the dc power from the inverter in order that the inverter rectifiers may be turned off. The diverter may include a tank circuit having a capacitor and an inductor connected across the dc power output through a diode and a silicon control rectifier is connected to the tank circuit for shunting the dc power from the inverter and applying a reverse voltage to the inverter. A harmonic suppression circuit is connected across the output of the converter and may include a capacitor connected between each of the three phase output lines of the inverter.

4 Claims, 6 Drawing Figures

SEMI-CONDUCTOR MOTOR CONTROL SYSTEM

CROSS-REFERENCE TO RELATED APPLICATION

This application is a continuation-in-part of application Ser. No. 496,688, filed May 20, 1983 now abandoned.

BACKGROUND OF THE INVENTION

Electrical machines have widespread use throughout industry. Most applications energize an electrical machine from fixed frequency voltages so that the machine is provided with a sine wave power while operating at a relatively fixed speed.

In many applications, it is desirable to vary the operating characteristics of the electrical motor such as its speed. Generally, variable speed operation in induction machines requires simultaneous variation of both the applied voltage and the applied frequency. Historically, this has been accomplished with special rotating machines between the induction motor and the power supply.

In recent years, high power semi-conductors have been utilized to provide the necessary voltage and frequency variations. Two solid state power conversion techniques generally available for the induction machine drive system are (1) dc voltage-fed forced-commutated inverter and (2) dc current-fed forced-commutated inverter. Both of these techniques utilize a two-step power conversion process by conversion of the fixed frequency and fixed voltage to a dc power link and conversion of the dc link power to variable frequency power for application to the induction machine.

Three primary disadvantages associated with either of these two conventional techniques are: (1) a relatively complex and costly inverter configuration using, in addition to the main switching devices, a multiplicity of auxiliary devices for main device turnoff and reactive current flow, (2) relatively high values of harmonic current flow in the induction machine unless even more complex switching patterns are used by the inverter. The harmonic currents create undesirable losses in the induction machine without creating useful output power, and (3) steep voltage wavefronts are applied to the induction machine which requires that special techniques be used for insulating the machine windings.

Similarly, the use of synchronous machines as variable speed drive systems are common. The synchronous machine field can be controlled by an auxiliary power supply. The technique of utilizing synchronous machine winding potentials to perform turn-off of power supplies using SCR's is well known. However, such systems have disadvantages of low power factor, creation of pulsating torques, require extra insulation, and has undesirable harmonics.

The present invention is directed to various improvements in a semi-conductor control system for controlling three phase motors by varying the voltage and/or frequency without the disadvantages of the prior art systems.

SUMMARY

The present invention is directed to an electrical circuit for varying the operation of a three phase ac motor including a circuit for providing dc power, and an output inverter bridge having six silicon controlled rectifiers or thyristors for receiving dc power and converting the dc power to three phase output ac power for operating a three phase motor. A diverter network means is connected between the input dc power and the output inverter. The diverter network is activated periodically for temporarily diverting the dc power from the inverter in order that the thyristors in the inverter may be turned off.

A still further object of the present invention is wherein the diverter network includes a tank circuit having a capacitor and an inductor connected across the dc power with switching means for shunting the dc power from the inverter to the tank circuit and applying a reverse voltage from the tank circuit to the inverter for turning off the silicon controlled rectifiers.

Yet a still further object of the present invention is wherein the diverter network includes a tank circuit having a capacitor and inductor connected across the dc power through a first diode, and a silicon controlled rectifier connected to the tank circuit and a second diode connected in parallel with the silicon controlled rectifier for providing full cycle resonance of the tank circuit. In one preferred embodiment, the diverter network is activated each sixty electrical degrees for changing the frequency of the inverter output.

Still a further object of the present invention is the provision of a harmonic suppression circuit connected across the output of the inverter. Preferably, the harmonic suppression circuit includes a capacitor connected between each of the three phase output lines of the inverter for modifying the wave forms delivered from the inverter.

Still a further object of the present invention is wherein the dc power circuit includes a three phase full wave bridge circuit having six silicon controlled rectifiers whereby three phase ac output supply to the bridge provides a voltage controlled dc power output.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

Figure 1:
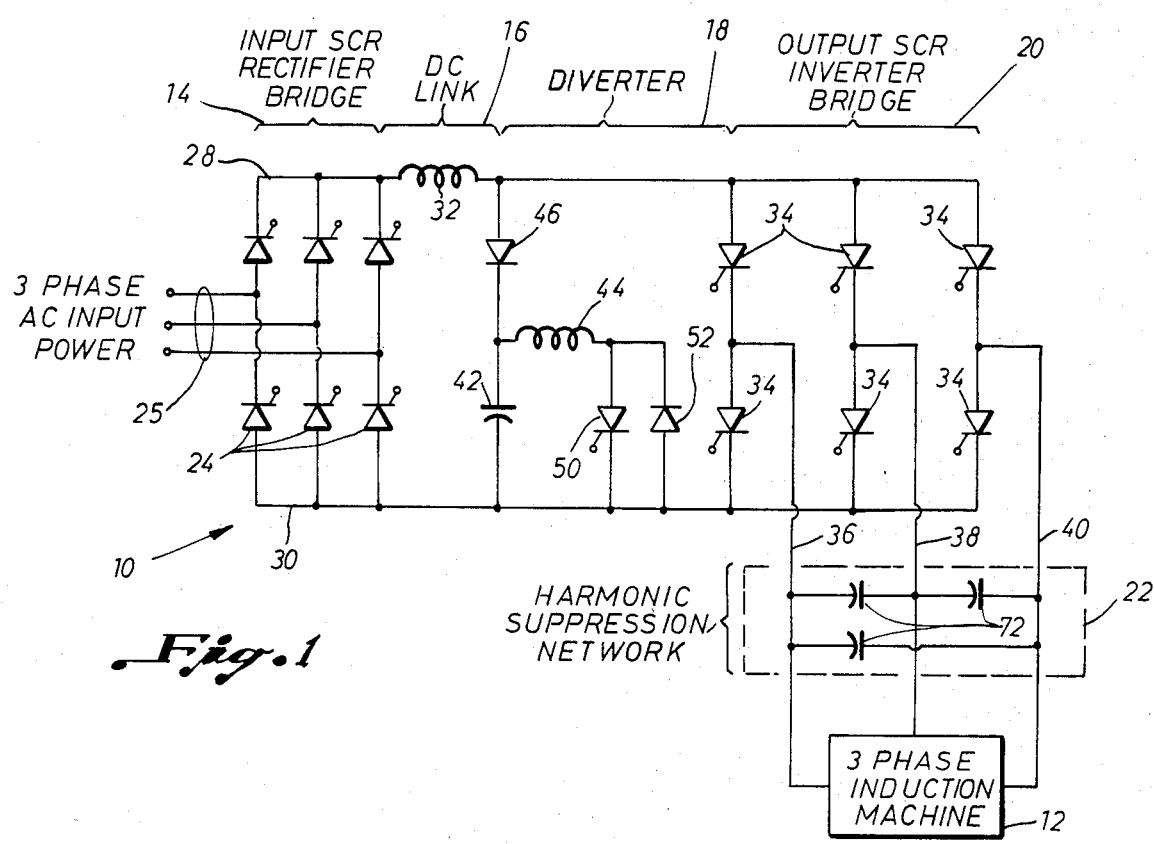
FIG. 1 is an electrical schematic of the control system of the present invention controlling an induction motor.

Referring now to the drawings, particularly to FIG. 1, the reference numeral 10 generally indicates the control system of the present invention for controlling a three phase induction motor or machine 12. The circuit 10 includes an input dc power circuit 14, a dc link 16, a diverter circuit 18, an output inverter bridge 20, and a harmonic suppression network 22.

While under certain applications and circumstances, any suitable type of input circuit providing dc power is satisfactory, such as a diode rectifier bridge or a dc to dc chopper, the preferred input power is provided by an input controlled rectifier bridge consisting of six silicon controlled rectificers (SCR's) or thyristors 24. The bridge input is connected to any suitable three phase alternating current input power 25 and the bridge 14 provides at its output rectified dc current in the power lines 28 and 30. The input SCR rectifier bridge 14 has the ability of providing a voltage controlled dc power output by suitable control of SCR's or thyristors 24. Such a bridge is conventional and the output dc power is generally passed through a dc link consisting of an inductor 32 to provide a relatively smooth and controlled dc current output.

The output SCR inverter bridge 20 is different from the prior inverter configurations. The output inverter 20 is an inversion of the input SCR rectifier bridge 14 and does not require any other internal components to be added to achieve proper operation of the induction machine 12 as does the prior art inverters. The bridge 20 receives dc power and with its six silicon controlled rectifiers 34 converts the dc power into a three phase alternating current output for actuating the induction machine 12. The SCR's or thyristors 34 are controlled to provide the desired frequency output on the three phase output lines 36, 38 and 40. Two additional circuits are added externally to the main power handling bridges 14 and 20 which are a diverter network 18 and a harmonic suppression network 22.

The diverter network 18 is a circuit which permits the turnoff, or commutation of the thyristor devices 34 in the inverter 20. The network 18 is connected to the dc power link 16 and acts to momentarily divert the dc input current away from the inverter 20 while simultaneously applying a reverse voltage to the entire inverter assembly 20 thereby turning off the thyristors 34. These actions perform the forced commutation of all six inverter thyristors 34. This process is accomplished by reverse charging a capacitor 42 which is in a tank circuit with an inductor 44. The capacitor 42 is connected across the dc power lines 28 and 30 through a diode 46. A switch, such as thyristor 50 is connected to the tank circuit and when turned on, essentially shunts away the dc current from the inverter 20 through the tank circuit and reverse charges the capacitor 42. The reverse charge voltage on the capacitor 42 is applied to the thyristors or SCR's 34 of the inverter 20 to turn off or commutate the thyristors 34. After each reverse charge, the thyristor 50 is turned off by current flowing through the diode 52 to complete the diverting cycle.

After the commutation of the inverter 20 is completed, the capacitor 42 is recharged to its initial stage in preparation for the next cycle. After the commutation process, the thyristors 34 will be turned on as scheduled in their normal firing sequence. Preferably, the diverter network 18 will be activated each sixty electrical degrees or six times each electrical cycle. This commutation technique, where all six SCR's 34 are turned off at the same time by the same external circuit 16, is extremely reliable and cost effective.

Figure 2:
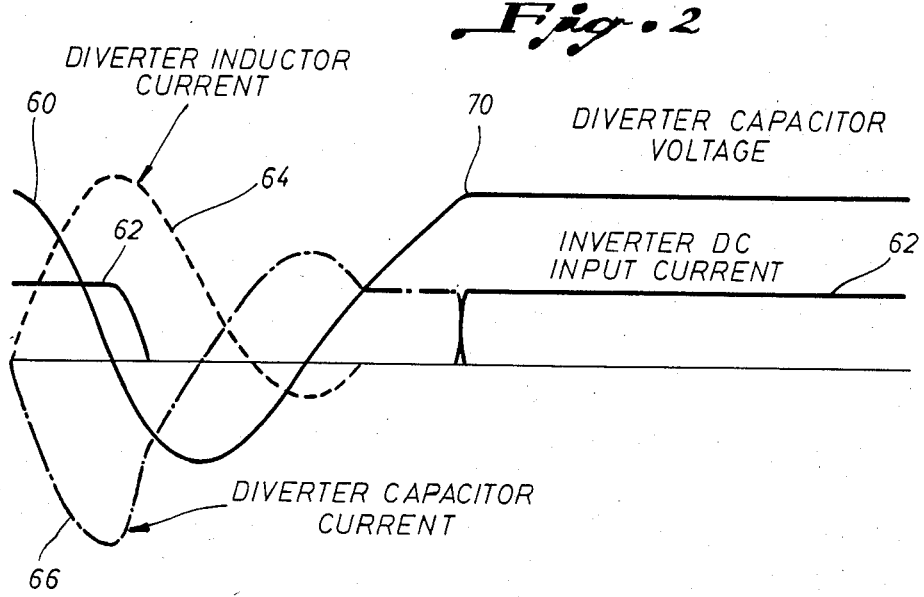
FIG. 2 is a graph representing the various wave forms and voltages in the diverter during a cycle of operation.

Referring now to FIG. 2, the wave forms of the various voltages and currents in the diverter 18 is best seen in FIG. 2. Thus, the voltage 60 on the capacitor 42 is initially charged, but on actuation of the thyristor 50 the voltage 60 declines and reverses to cut off the inverter dc input current 62. The current graph 64 is the current in the inductor 44. The graph 66 indicates the current in the capacitor 42. At point 70 the capacitor is again recharged to its initial state and the switch 50 has been turned off in preparation for the next cycle, and the capacitor current 66 drops to zero and the inverter dc current input 62 is again supplied to the inverter 20 awaiting for the firing of the thyristors 34 to provide the desired frequency at the output lines 36, 38 and 40.

Referring now again to FIG. 1, the harmonic suppression network 22 may be of any desired circuit for suppressing the undesired harmonics delivered from the output of the inverter 20. Preferably the harmonic suppression network 22 is comprised of low cost capacitors 72 connected between each of the output lines 36, 38 and 40 of the inverter 20 leading to the induction machine 12. As indicated, the primary function of the circuit 22 is to modify the relatively crude wave forms delivered from the inverter 20 by acting in conjunction with the impedances of the ac machine 12 to smooth the wave forms such that the ac machine 12 does not have to handle the undesirable harmonics or the voltage transients associated with inverter switching operations. Since the network 22 is primarily capacitive, a secondary benefit of power factor correction is also achieved. This secondary benefit permits a somewhat lower kva rating of the drive system for most applications.

When operating an induction machine 12 in the variable speed mode, it is necessary to energize the stator with a set of voltages which maintain proper excitation to the stator windings and at the same time, create the frequency which will provide for slip conditions allowing the machine 12 to meet the system torque requirements. The present system 10 provides a drive system which creates the proper voltages by controlling the dc output of the rectifier section 14 and, simultaneously, creates the proper frequency with the firing signals delivered to the inverter section 20 by use of the diverter 18. Normally, the voltage and frequency are directly related. When a command is received to increase the speed of the machine 12, increased power is delivered to the machine 12 through the rectifier 14 and dc link 16 and the frequency of the inverter 20 is increased to maintain proper slip conditions. Response to a decrease in speed command is the opposite set of actions.

Figure 3:
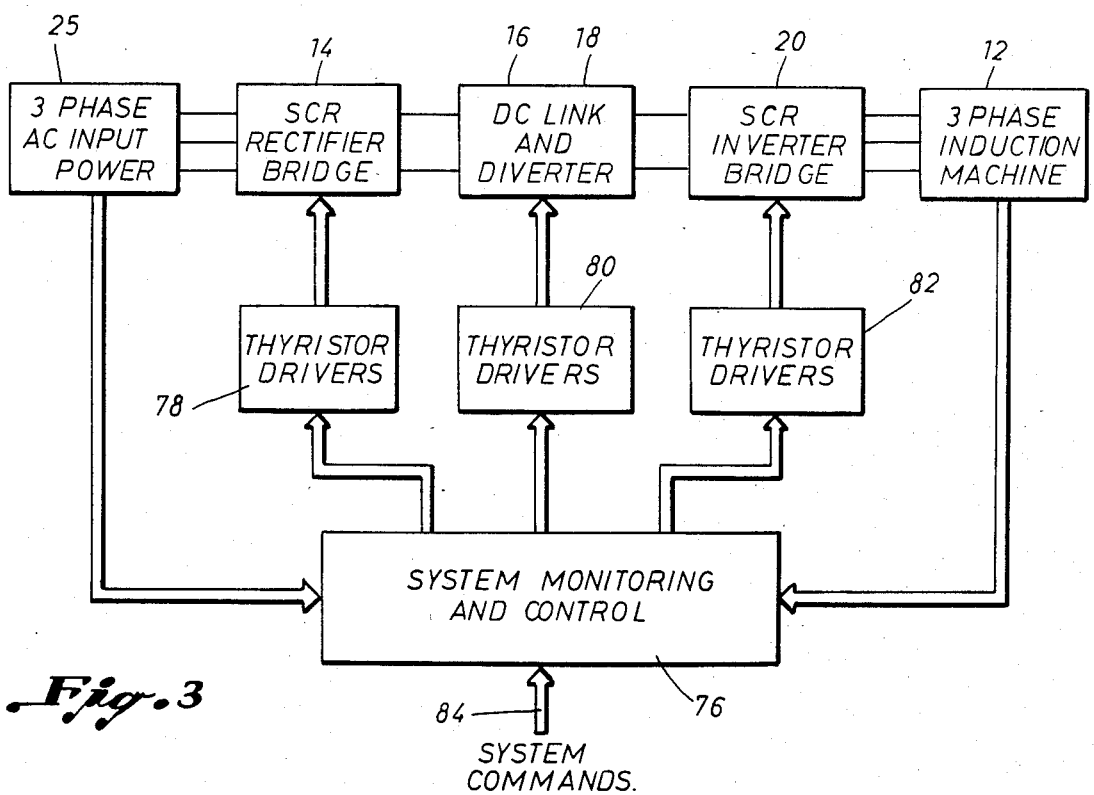
FIG. 3 is a block diagram of a conventional control system controlling the circuit of FIG. 1.

A block diagram of a typical control system is shown in FIG. 3. In the normal mode of operation, where speed control is desired, the output frequency of the machine 12 is sensed and a suitable system monitoring and control section 76 controls the thyristor drivers 78 controlling the thyristors 74 in the rectifier bridge 14, controls the thyristor driver 80 of the thyristor 50 in the diverter 18, and controls the thyristor drivers 82 which in turn control the thyristors 34 in the inverter bridge 20 to maintain the desired speed setting. In addition, a change in speed command 84 can also provide the desired change in speed. While the present system 10 is described as controlling a speed command, for purposes of illustration only, the inherent flexibility of the variable speed drive system 10 permits a wide variety of parameters to be monitored and easily used for system control. Output power, motor current, motor torque, or various load conditions are examples of parameters that can be used to control the system to maintain a specific value, or limit the system operation if a preset value is reached.

Figure 4A:
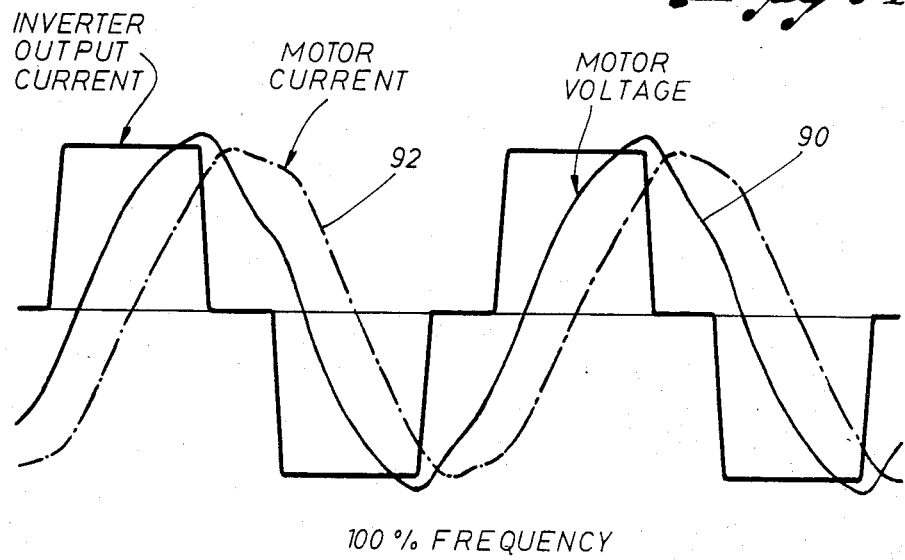
FIG. 4A is a graph of the waveforms of the inverter output at 100% frequency and power.
Figure 4B:
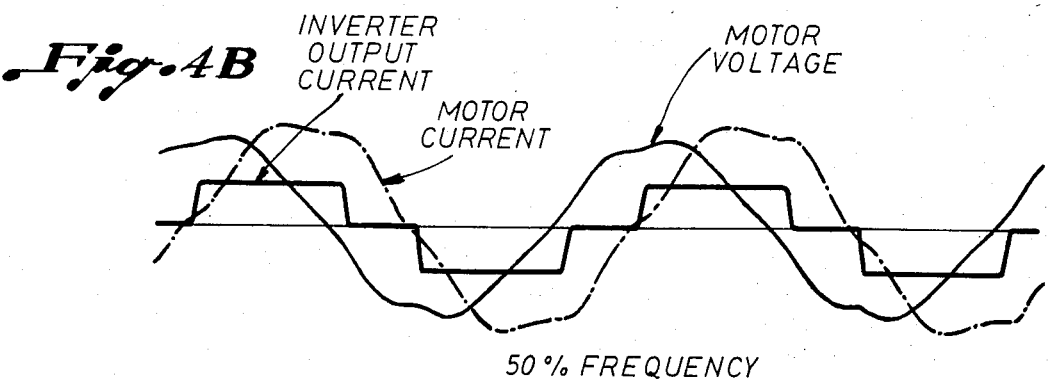
FIG. 4B is a graph of the waveform output of the inverter at 50% frequency and current except that the graph time is double that of FIG. 4A.

Referring now to FIG. 4A, wave forms representing the inverter output current and the motor current and motor voltage are shown at full speed and 100% frequency. It is noted that the voltage 90 and current 92 associated with the machine 12 does not have any of the current or voltage anomolies which are usually associated with the prior art techniques of providing variable voltage and current for driving an ac induction machine. FIG. 4B illustrates the curves of FIG. 4A at 50% load and frequency although the time frame is double in FIG. 4B to show two complete cycles instead of a single cycle as actually occurs on 50% frequency.

The present system has many advantages: (1) the input and output SCR bridges 14 and 20 are constructed in identical manner and the configuration is well known, cost effective and has an excellent reliability history; (2) the system 10 can operate under proper conditions without the external forced commutation of the diverter network 18 over certain speed ranges; (3) the harmonic suppression capacitors 72 may utilize capacitors in common use in utility power systems which have a demonstrated low cost, high efficiency and excellent reliability; (4) the drive system provides voltages and currents to the induction machine 12 which are much smoother than that available from conventional variable speed drive techniques which permits the use of a standard machine without an increased rating to accommodate harmonics or transient voltages; (5) because the harmonic suppression network is made up of principally of capacitors, the network 22 may act to excite the machine 12 in the generator mode of operation, and thus the system 10 can be operated in the reverse power flow mode if desired; (6) the need for special current limiting starters which is normally required for induction motors is eliminated since that function is inherent in the design of the system 10.

The largest benefit from the present system will probably be obtained in the high power ranges, that is, from 500 to 50,000 horsepower, where the competitive costs, increased efficiency, and high reliability of the present system 10 will be highly beneficial.

The above-named description of the present invention was directed to its use in controlling an induction motor. However, the present invention is also applicable and produces a significant improvement over existing techniques which are presently used for driving synchronous machines. Variable speed drive synchronous machines can be controlled by an auxiliary power supply, such as a field exciter which causes the potential of the synchronous machine to be proportional to both the field current and the rotary speed of the machine. Thus, when the machine is turning, the combination of rotation and field excitation will produce specific voltage on the machine stator windings. These voltages may be utilized to provide the turn-off, or commutation, of the power devices in the variable frequency power supply which drives the machine stator winding.

Figure 5:
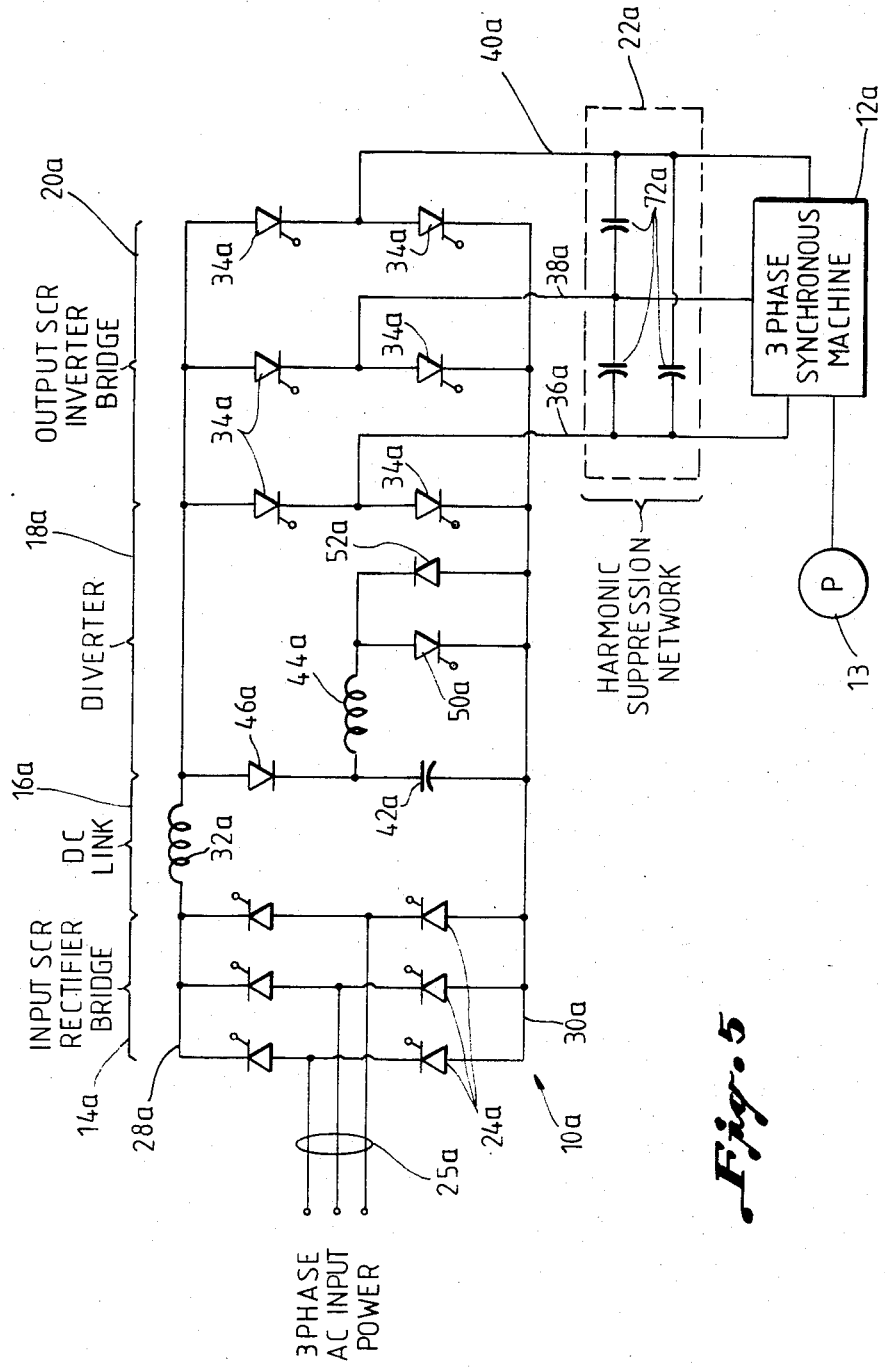
FIG. 5 is an electrical schematic of the control system of the present invention controlling a synchronous motor.

Referring now to FIG. 5, the embodiment of the present invention for controlling a synchronous motor is best seen, where like parts to those in FIG. 1 have like numbers, with the addition of the suffix "a". It is to be noted that the control system 10a is generally identical to the control system 10 of FIG. 1. However, in the case of a three-phase synchronous machine 12a, a power supply 13 is provided connected to the synchronous machine 12a in order to control the excitation of the machine 12. The auxiliary power supply 13 may be a conventional field exciter. Also in some applications, the motor 12a would contain a shaft position indicator for determining optimum torque conditions.

The application of the control system 10a to synchronous motors will provide the advantages described in connection with FIG. 1. In addition, there are significant advantages associated with the synchronous machine which include (1) the power factor of the synchronous machine, when operating, can be essentially unity whereby there is no need to size the machine larger than that required to drive the maximum shaft load, (2) the torque pulsations resulting from maintaining a small displacement angle between the winding current and the machine field flux waveform are relatively small, (3) the insulation system associated with the stator windings does not have to have the ability to handle rapid voltage transients, (4) the problem of starting the synchronous machine from a zero speed condition has been effectively eliminated.

When operating a synchronous machine 12b in the variable speed mode, it is necessary to energize the rotor field with dc current. The power for this dc excitation is usually supplied from an auxiliary machine 13 on the same shaft as the main machine 12b. The exciter machine 13 has several well-known forms and usually includes a set of rectifiers on the rotor assembly which change the ac output of the exciter machine to the dc power necessary for the main machine field. Once excited, the synchronous machine will produce torque when current is flowing in the stator windings. However, in contrast with the induction motor 12 of FIG. 1, where the inverter devices are operated at a frequency slightly different from the machine 12 to create "slip", the inverter devices for the synchronous motor drive system will be turned on and off at the same frequency as the machine winding potential.

The operating frequency of the system 10a depends entirely upon the speed of the synchronous machine 12a. Normally, the machine potential and speed are directly related. That is, a machine operated at a rate of frequency will produce rated potential and this potential is controlled by the field exciter 13. When operating at 75% frequency, the machine will produce about 75% rated voltage. Otherwise, the same control operation described in connection with the control system 10 of FIG. 1 is applicable to the control system 10a for synchronous motors in FIG. 5.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. An electrical circuit for varying the operation of a three phase electrical ac motor comprising,
    an input circuit for providing a dc current output,
    an output inverter bridge having six silicon controlled rectifiers for receiving dc current and converting the dc current to three phase ac power for operating a three phase electrical motor,
    a diverter network means connected between the input circuit and the output inverter activated periodically for temporarily diverting the dc current output from the inverter in order that six silicon controlled rectifiers may be turned off, said diverter network includes, a tank circuit having a capacitor and inductor connected across the dc current output through a first diode, an additional silicon controlled rectifier connected to said tank circuit for shunting off the dc current from the inverter and applying a reverse voltage to the inverter for turning off all of the silicon controlled rectifiers of the inverter, and a second diode connected in parallel with the additional silicon controlled rectifier for providing a full cycle resonance of the tank circuit.

2. The apparatus of claim 1 including a harmonic suppression circuit including, a capacitor connected between each of the three phase outputs of the inverter.

3. An electrical circuit for varying the operation of a three phase electrical ac motor comprising, an input circuit for providing a dc current output, an output inverter bridge having six silicon controlled rectifiers for receiving dc current and converting the dc current to three phase ac power for operating a three phase electrical motor, a diverter network means connected between the input circuit and the output inverter activated periodically for temporarily diverting the dc current output from the inverter in order that six silicon controlled rectifiers may be turned off, said diverter network includes, a capacitor and inductor connected in parallel across the dc current output through a first diode, an additional silicon controlled rectifier connected in series with said inductor for shunting off the dc current from the inverter and applying a reverse voltage to the inverter for turning off all of the silicon controlled rectifiers of the inverter, and a second diode connected in parallel with the additional silicon controlled rectifier for providing a full cycle resonance of the tank circuit.

4. The apparatus of claim 3 including a harmonic suppression circuit including, a capacitor connected between each of the three phase outputs of the inverter.

* * * * *